United States Patent
Yi et al.

(10) Patent No.: US 8,059,544 B2
(45) Date of Patent: Nov. 15, 2011

(54) DISTANCE ADAPTIVE ROUTING PROTOCOL

(75) Inventors: Yunjung Yi, St. Louis, MO (US); Vicraj T. Thomas, Golden Valley, MN (US); George L. Wright, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 688 days.

(21) Appl. No.: 11/613,700

(22) Filed: Dec. 20, 2006

(65) Prior Publication Data

US 2008/0151889 A1    Jun. 26, 2008

(51) Int. Cl.
    *H04L 12/26*    (2006.01)
(52) U.S. Cl. ........................................... 370/236
(58) Field of Classification Search .................. 370/238,
    370/390, 229, 235, 236, 237, 241, 252, 254,
    370/255, 310, 351, 389, 392, 400, 412, 413,
    370/428, 429
    See application file for complete search history.

(56) References Cited

U.S. PATENT DOCUMENTS

| | | | | |
|---|---|---|---|---|
| 5,173,689 A * | 12/1992 | Kusano | ........................ | 370/225 |
| 6,199,010 B1 | 3/2001 | Richton | | |
| 6,741,565 B1 | 5/2004 | Wicklund | | |
| 6,804,244 B1 | 10/2004 | Anandakumar | | |
| 6,892,131 B2 | 5/2005 | Coffee et al. | | |
| 7,006,453 B1 | 2/2006 | Ahmed | | |
| 7,190,672 B1 | 3/2007 | Whitehill | | |
| 7,796,503 B2 | 9/2010 | Hamada | | |
| 7,864,775 B2 | 1/2011 | Shackleton | | |
| 2001/0052072 A1 * | 12/2001 | Jung | ............................ | 713/160 |
| 2002/0067693 A1 * | 6/2002 | Kodialam et al. | ............. | 370/216 |
| 2002/0145978 A1 | 10/2002 | Batsell | | |
| 2002/0150050 A1 | 10/2002 | Nathanson | | |
| 2002/0191584 A1 * | 12/2002 | Korus et al. | .................... | 370/349 |
| 2003/0083060 A1 | 5/2003 | Menendez | | |
| 2003/0118044 A1 * | 6/2003 | Blanc et al. | .................... | 370/414 |
| 2003/0128706 A1 * | 7/2003 | Mark et al. | ................. | 370/395.1 |
| 2003/0174652 A1 * | 9/2003 | Ebata | ............................ | 370/235 |
| 2004/0174824 A1 * | 9/2004 | Ohta et al. | ..................... | 370/252 |
| 2004/0258064 A1 * | 12/2004 | Nakamura et al. | ............ | 370/389 |
| 2004/0260829 A1 * | 12/2004 | Husak et al. | ................... | 709/232 |
| 2005/0054346 A1 | 3/2005 | Windham et al. | | |
| 2005/0073958 A1 | 4/2005 | Atlas et al. | | |
| 2005/0105469 A1 * | 5/2005 | Hao | ............................... | 370/235 |
| 2005/0163145 A1 * | 7/2005 | Dombkowski et al. | ........ | 370/432 |

(Continued)

FOREIGN PATENT DOCUMENTS

EP    1134940    9/2001

(Continued)

OTHER PUBLICATIONS

Baccelli et al., "OSPF MPR Extension for Ad Hoc Networks", Feb. 1, 2007, Publisher: IETF Standard Working Draft.

(Continued)

*Primary Examiner* — Derrick Ferris
*Assistant Examiner* — Omar Ghowrwal
(74) *Attorney, Agent, or Firm* — Fogg & Powers LLC

(57) ABSTRACT

A method of routing packets in an ad-hoc network is provided. The method determines a hop count for a route. Then, a redundancy value is calculated based on the hop count. A plurality of packets containing identical payload information is then sent down a number of routes equal to the redundancy value.

20 Claims, 12 Drawing Sheets

U.S. PATENT DOCUMENTS

| | | | |
|---|---|---|---|
| 2005/0174936 A1* | 8/2005 | Betker | 370/230 |
| 2005/0190767 A1* | 9/2005 | Lee et al. | 370/395.1 |
| 2005/0265256 A1 | 12/2005 | Delaney | |
| 2006/0002337 A1* | 1/2006 | Itoh et al. | 370/328 |
| 2006/0023677 A1 | 2/2006 | Labrador et al. | |
| 2006/0056353 A1 | 3/2006 | McBride | |
| 2006/0098608 A1 | 5/2006 | Joshi | |
| 2006/0109831 A1 | 5/2006 | Tillotson | |
| 2006/0250999 A1* | 11/2006 | Zeng et al. | 370/312 |
| 2007/0037568 A1 | 2/2007 | Warner et al. | |
| 2007/0043656 A1 | 2/2007 | Lancaster | |
| 2007/0054697 A1 | 3/2007 | Money et al. | |
| 2007/0070983 A1 | 3/2007 | Redi et al. | |
| 2007/0076633 A1 | 4/2007 | Sin | |
| 2007/0121521 A1 | 5/2007 | D'Amico et al. | |
| 2007/0140114 A1* | 6/2007 | Mosko | 370/229 |
| 2007/0153817 A1 | 7/2007 | Osann | |
| 2007/0286097 A1* | 12/2007 | Davies | 370/255 |
| 2008/0151793 A1 | 6/2008 | Wright | |
| 2008/0151841 A1 | 6/2008 | Yi et al. | |
| 2009/0160679 A1 | 6/2009 | Shackleton | |
| 2009/0190514 A1 | 7/2009 | Yi | |
| 2011/0060828 A1 | 3/2011 | Shackleton | |

FOREIGN PATENT DOCUMENTS

| | | |
|---|---|---|
| WO | 2006072850 | 7/2006 |

OTHER PUBLICATIONS

Clausen et al., "Optimized Link State Routing Protocol (OLSR)", Oct. 1, 2003, Publisher: IETF Standard, Internet Engineering Task Force.

Clausen et al., "The Optimized Link State Routing Protocol Version 2", Jul. 9, 2007, Publisher: IETF Standard-Working-Draft.

Jacquet et al., "Optimized Link State Routing Protocol for Ad Hoc Networks", "Multi Topic Conference, 2001. IEEE INMIC 2001. Technology for the 21st Century Proceedings.", Dec. 28-30, 2001, pp. 62-68, Publisher: IEEE International, Published in: Piscataway, NJ, USA.

Nguyen et al., "Maintaining Communication Link for Tacitcal Ground Robots", "AUVSI Unmanned Systems North America 2005", Aug. 2004, pp. 1-13, Publisher: AUVSI.

Zhang et al., "Dynamic Proxy Tree-Based Data Dissemination Schemes for Wireless Sensor Networks", "2004 IEEE International Conference on Mobile Ad-Hoc and Sensor Systems", Oct. 2004, pp. 21-30, Publisher: IEEE.

Basagni et al., "A Distance Routing Effect Algorithm for Mobility (DREAM)", "Proceedings of the 4th Annual ACM/IEEE International Conference on Mobile Computing and Networking", Oct. 1998, pp. 76-84, Publisher: MOBICOM, Published in: New York US.

Little, T. et al., "An Information Propagation Scheme for VANETs", "Intelligent Transporation Systems", Sep. 13, 2005, pp. 155-160, Publisher: IEEE.

Wischhof, L. et al., "Congestion Control in Vehicular ad hoc Networks", "Vehicular Electronics and Safety", Oct. 14, 2005, pp. 58-63, Publisher: IEEE International Confereone on XI'AN.

Basagni et al., "A Distance Routing Effect Algorithm for Mobility (DREAM)", "Proceedings of the 4th Annual ACM/IEEE International Conference on Mobile Computing and Networking", Oct. 1998, pp. 76-84, Publisher: MOBICOM, Published in: New York US.

Camara et al., "A Novel Routing Algorithm for Ad Hoc Networks", "Proceedings of the Annual Hawaii International Conference on System Sciences", 2000, pp. 1-8, vol. 2, Published in: Hawaii US.

European Patent Office, "European Search Report", Jan. 24, 2008, Published in: EP.

Jain et al., "Geographical Routing Using Partial Information for Wireless Ad Hoc Networks", "IEEE Personal Communications", Feb. 2001, pp. 48-57, vol. 8, No. 1, Publisher: IEEE Communications Society, Published in: US.

Lin X et al., "Location-Based Localized Alternate, Disjoint and Multi-Path Routing Algorithms for Wireless Networks", "Journal of Parallel and Distributed Computing", Jan. 2003, pp. 22-32, vol. 63, No. 1, Publisher: Elsevier, Published in: Amsterdam NL.

Marina et al., "Ad Hoc On-Demand Multipath Distance Vector Routing", "Mobile Computing and Communications Review", Jul. 2002, pp. 92-93, vol. 6, No. 3, Publisher: ACM.

"Networking on the Move", "Military & Aerospace Electronics, www.milaero.com", Jun. 2005, p. 32, Publisher: Penn Well Publishing Co.

Tardec, "National Automotive Center Betronics Intelligent Systems Conference Paper IVSS-2005-MAS-01", "Intelligent Vehicle Systems Edition 2005", Jun. 2005, p. 240, Publisher: U.S. Army Tank Automotive Research, Development and Engineering Center, Published in: US.

* cited by examiner

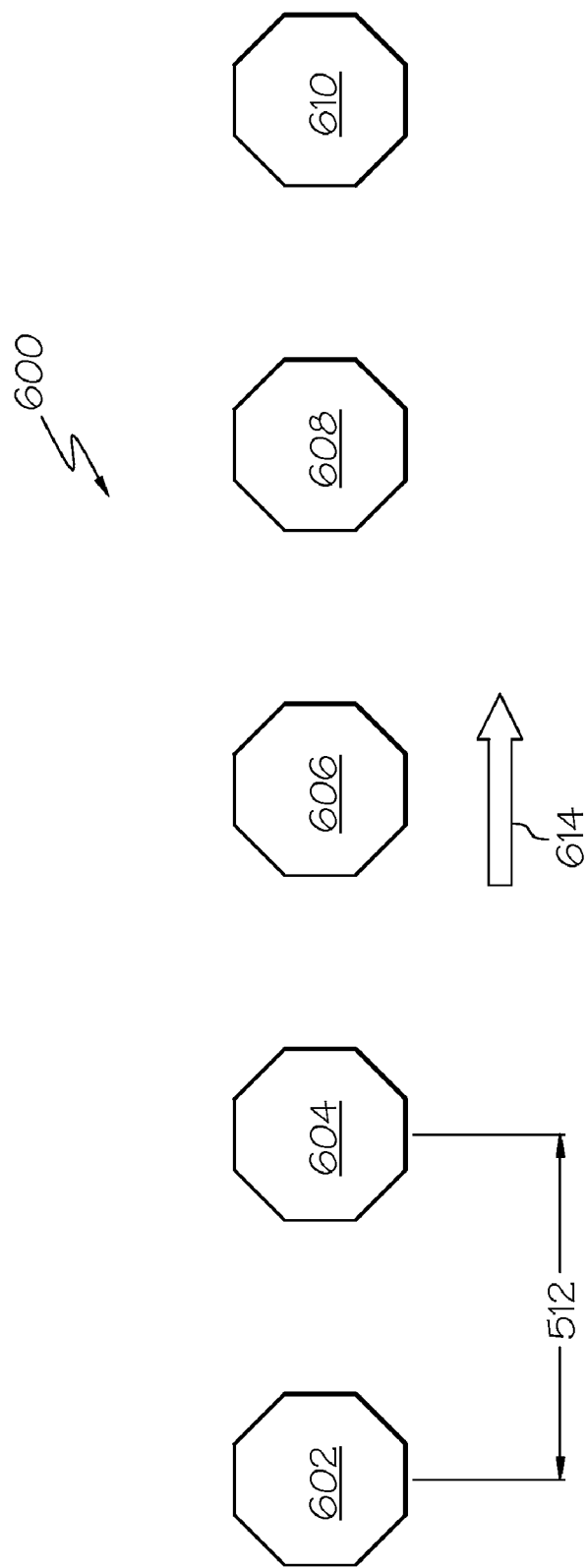

DISTANCE ADAPTIVE ROUTING PROTOCOL

CROSS REFERENCE TO RELATED APPLICATIONS

This application is also related to the following applications filed on even date herewith, all of which are hereby incorporated herein by reference:

U.S. patent application Ser. No. 11/613,749, entitled "VOICE-OVER-INTERNET PROTOCOL INTRA-VEHICLE COMMUNICATIONS,"; and U.S. patent application Ser. No. 11/613,730, entitled "CONFIGURATION AWARE PACKET ROUTING IN AN AD-HOC NETWORK,".

BACKGROUND

In any convoy of utility vehicles or other applications wherein a group of vehicles are in close proximity, intra-convoy voice communications and the ability to efficiently transfer data among the vehicles are imperative for safe and efficient operations. This is especially true during operation of convoys of military utility vehicles. One method of real-time, direct voice intra-convoy communications within a convoy is via individual communication devices, such as walkie-talkies, used within the convoy. Other more advanced concepts may incorporate satellite communications from one or more vehicles within the convoy. This satellite communications is hampered by the number of satellite-equipped vehicles, and usually is restricted to satellite text message systems. Furthermore, since the signal must be bounced off a satellite orbiting the earth, there is an inherent delay in the text message communications. This time delay could prove critical to safe convoy operations. There is a need for real-time, voice communications among the vehicles in a convoy.

One of the factors that inhibit communication systems in convoys is the lack of a fixed infrastructure of nodes and antennas in the areas where convoys operate. Attempts have been made to overcome this problem by establishing communication via mobile ad-hoc networks (MANET). A MANET consists of a number of geographically-distributed, potentially mobile nodes sharing one or more common radio channels. MANETs differ from other networks (e.g. Internet, wireless LAN), because a MANET lacks a fixed infrastructure. Instead of having centralized routers/servers and local access points, the network consists of only nodes and each node behaves as a router and forwards packets through the network. A MANET can be created and adjusted on the fly as the nodes enter and exit the network.

In addition to military convoy operations, MANETs are also being developed for civilian use. MANETs are more difficult to administer than a fixed infrastructure network, but there are many situations in which a fixed infrastructure network is impractical or unavailable, e.g. after a natural disaster. Currently, military operations are a major driving force in the development of MANETs, but new applications continue to emerge.

MANETs pose many challenges to current designers. Due to the lack of a central controller and processor, all functions must be distributed amongst the nodes. As a result, all nodes are essentially the same in their construction. Additionally, in a wireless setting the distance between two nodes may be greater than the radio transmission range of the nodes. This forces information to be hopped through other nodes to get to the destination node. As the network grows in size, routing the information through the nodes becomes more complex. As a result, much effort has been put into the design of routing protocols. The routing protocol for a network can greatly affect the speed and quality of a MANETs service. Routing protocols must adapt to the frequent changes in the network, and often must do so with information that is not current with network activities. Further, gathering new information about the network puts a strain on network resources and may not update frequently enough to be effective.

One of the greatest difficulties confronting ad hoc wireless networks is route recovery after a route breakage occurs. Often breakages are the result of two nodes on a route losing communication with each other. Loss of communication can result from one of the nodes leaving the network, or when the distance between nodes becomes longer than the transmission range of the nodes. Physical barriers, interference, and other natural phenomena can also interrupt the communication path. Two opposing protocol designs have been developed to improve route recovery, one proactive and one reactive.

The proactive protocols require each node to maintain a current routing table with routes to every other node in the network regardless of whether any data transmission will occur with the other nodes. Proactive routing protocols have a short latency for discovery of a route, because a source node already has the route to a destination node in its routing table. Maintaining a current routing table, however, causes proactive protocols to use a considerable amount of network resources. Nodes are continually sending packets around the network as they verify routes to ensure their routing tables are up to date. Some examples of proactive protocols are Open Storage Path First (OSPF), Optimal Link State Routing (OLSR), and Topology Broadcast based on Reverse-Path Forwarding (TBRPF).

At the other end of the spectrum are the reactive protocols. Reactive protocols require a node to maintain information only on current or recently used routes in which the node itself is involved. Under these protocols, a source node initiates route discovery only when the source node needs to send packets to a destination that is not on a current route the source node is using. Thus, network resources are not unnecessarily tied up discovering routes that may never be used. The route discovery process, however, will incur a large latency during startup of the route because a new route must be discovered before data can be sent. Reactive protocols generally show better bandwidth efficiency than proactive routing if there are a small number of source-destination pairs. Some examples of reactive protocols are Ad hoc On-demand Multi-path Distance Vector (AOMDV) and Dynamic Source Routing (DSR).

Other approaches have been developed to try and avoid the pitfalls of the proactive and the reactive protocols. One such protocol selectively chooses routes based on factors such as end-to-end delay, route lifetime, and quality of service. Systems have also been developed that balance the packet load across multiple paths. Other approaches have developed a hybrid of proactive and reactive approaches. These hybrid protocols do not discover routes until there is data to send on the route, however, instead of discovering only a single route, the hybrid protocol discovers multiple routes. Multiple routes insure that there is always a backup in case a breakage occurs in the primary route.

For the reasons stated above, and for other reasons stated below which will become apparent to those skilled in the art upon reading and understanding the present specification, there is a need in the art for a method of routing a packed over an ad hoc network that improves the error rate of longer routes.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, a method of routing packets in an ad-hoc network is disclosed. The method determines a hop count for a route. Then, a redundancy value is calculated based on the hop count. A plurality of packets containing identical payload information is then sent down a number of routes equal to the redundancy value.

BRIEF DESCRIPTION OF THE DRAWINGS

The present invention can be more easily understood and further advantages and uses thereof more readily apparent, when considered in view of the detailed description and the following figures in which:

FIG. 6 is a schematic view of yet another embodiment of nodes in a mobile ad-hoc network;

In accordance with common practice, the various described features are not drawn to scale but are drawn to emphasize specific features relevant to the present invention. Reference characters denote like elements throughout Figures and text.

DETAILED DESCRIPTION

Figure 1:
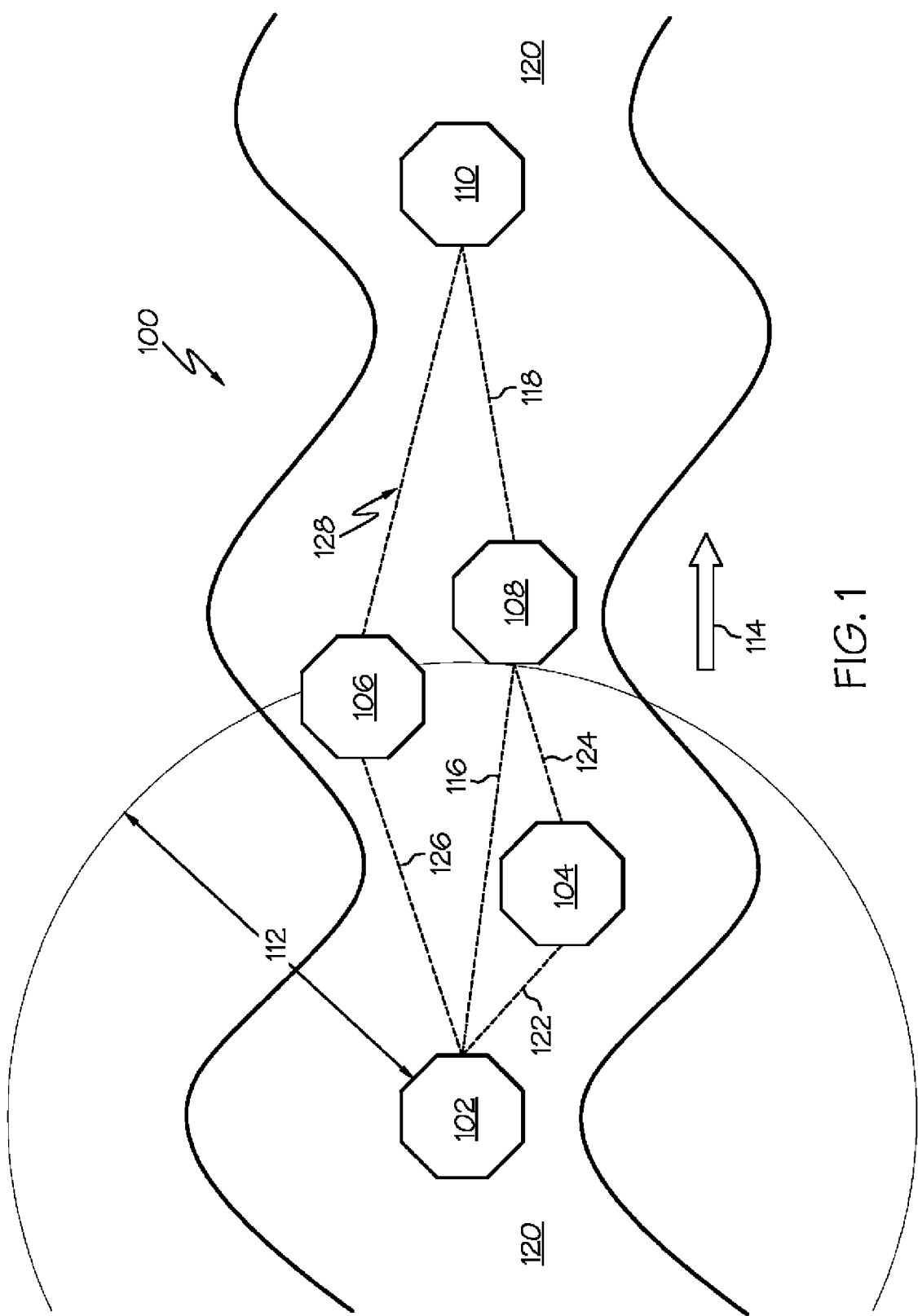
FIG. 1 is a schematic view of one embodiment of nodes in a mobile ad-hoc network.

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

One aspect of the present method and apparatuses allows a plurality of mobile vehicles to communicate with each other in real-time voice conversation. Each vehicle is equipped with a wireless hub and a unidirectional antenna. The vehicles form a MANET where each vehicle is given a unique Host ID. The vehicles communicate using the Wi-Fi standard. Once a MANET has been formed, real-time digital voice communications similar to Voice over Internet Protocol (VoIP) can be achieved between vehicles by addressing specific HostIDs. A vehicle need not be in direct communication with a destination to send it information. The voice signal can be hopped through other vehicles in the network to reach the destination. Since the system fully conforms to the Wi-Fi standard and long distance transmission is seldom needed, the system can operate with low power consumption.

The system also uses an omni-directional antenna to increase the network connections by allowing communication in any direction. Additionally, an omni-directional antenna leaves a smaller RF signature and is thus, more difficult for an intruder to intercept. Portable hubs can easily be added after the convoy has been deployed to allow add-in vehicles, such as contractor logistics support to communicate with the convoy. The system is easily extendable to intranet or public internet via a wireless access point gateway. Another benefit of the present system is that it is less expensive, and thus more accessible, than traditional tactical radios used by convoys. In another embodiment, the hardware is modified and the system is used for real-time video or other data communications.

A difficulty in establishing real-time applications such as VoIP in an Ad-hoc network setting is that real-time applications depend on a constant stream of data, and link breakages between nodes can interrupt the flow of packets. When a link breakage occurs in a VoIP application, the listener hears only silence and may wonder what has happened. The silence is caused because no information is currently being delivered to the node. This silence will continue until a new route to the destination is found. With existing protocols, route recovery can last 10-15 seconds or more. A delay of this length is unacceptable for a real-time application. An additional difficulty for VoIP is that existing protocols are typically designed for general use. The routing protocols, therefore, do not take into account any known information about the network when making routing decisions. Instead, routing protocols use a brute force method of discovering a route by trial and error.

A second aspect of the present methods and apparatuses addresses the above problems and improves the performance of routing protocols for real-time applications. This is accomplished by reducing the packets dropped after a route breakage. Packet drops are reduced by providing all nodes of an ad-hoc network with configuration information describing the relative locations of each of the nodes within the network. The configuration information enables an ad-hoc network to quickly route packets toward a destination node without having to fully discover a new route. Instead of holding or discarding the packets until a new route is found, the nodes consult the configuration information and quickly forward packets to a node in the direction of the destination. Packets are forwarded in this way until a new route is discovered by the routing protocol. Once the routing protocol has discovered a new route, the packets are once again routed with the routing protocol along the newly discovered route. Real-time applications, such as VoIP, can see improved reception, as fewer packets are dropped due to link breakages.

Another difficulty in implementing real-time systems over an ad-hoc network lies in the degrading route performance of a route as its length increases. As the number of hops in a route increases, the reliability of the route decreases. Since there is a certain probability of a packet being dropped each time the packet is sent through the air, the more hops a packet is sent over, the more likely it is that the packet will be dropped.

Thus, longer routes have a statistically larger number of packets that do not reach the destination. For instance, it has been discovered that the reliability of packet delivery sharply decreases after three hops of forwarding. Once a packet is dropped, a signal must be sent back to the source and the packet must be re-sent towards the destination. This presents a problem to applications, such as VoIP, that have strict requirements on packet arrival time.

A third aspect of the present method and apparatuses addresses the problem of decreasing route reliability by sending redundant packets towards the destination. Thus, even if the original packet does not reach the destination, the information can still arrive on time because a redundant packet may reach the destination. Since route reliability decreases as the distance to the destination increases, the number of redundant packets sent is adjusted based on the distance to the destination. For example, if the destination node is far from the origination node, a large number of duplicate packets are sent. In addition to simply sending the redundant packets, the present method can optionally send packets down multiple routes. Thus, if the original route is broken for an extended period of time, the information can still arrive on the redundant route. When sending packets down multiple routes, however, the packets may arrive at the destination out of order. The destination, therefore, collects the packets and reorganizes them, if necessary, before final processing.

FIG. 1 illustrates a block diagram of one embodiment of an ac-hoc network 100 comprising a plurality of nodes 102, 104, 106, 108, 110. In this embodiment ad-hoc network 100 has five nodes, but any number of nodes sufficient to establish a network could exist. In one embodiment, nodes 102, 104, 106, 108, 110 of ad-hoc network 100 are wireless and mobile. Alternatively, nodes 102, 104, 106, 108, 110 could be fixed wired nodes or any combination of mobile or fixed, wireless or wired nodes. In this embodiment, nodes 102, 104, 106, 108, 110 are similar in construction and function. Alternatively, nodes 102, 104, 106, 108, 110 may differ from each other in any way as long as each node can communicate with at least one other node.

In one embodiment, each node 102, 104, 106, 108 of network 100 initiates and runs an IP layer forming a wireless local area network (WLAN). Network 100 communicates using Wi-Fi and fully conforms to the Institute of Electrical and Electronics Engineers (IEEE) 802.11 standard. Nodes 102, 104, 106, 108, 110 are each given a unique Host ID to enable specific addressing by IP address. Each node can then send a packet over the network and address the packet to the destination IP address. When one node comes within range of the active wireless of another nodes, the two nodes will automatically synchronize; initiating a hand-shaking protocol that enables the two nodes to communicate.

Figure 2:
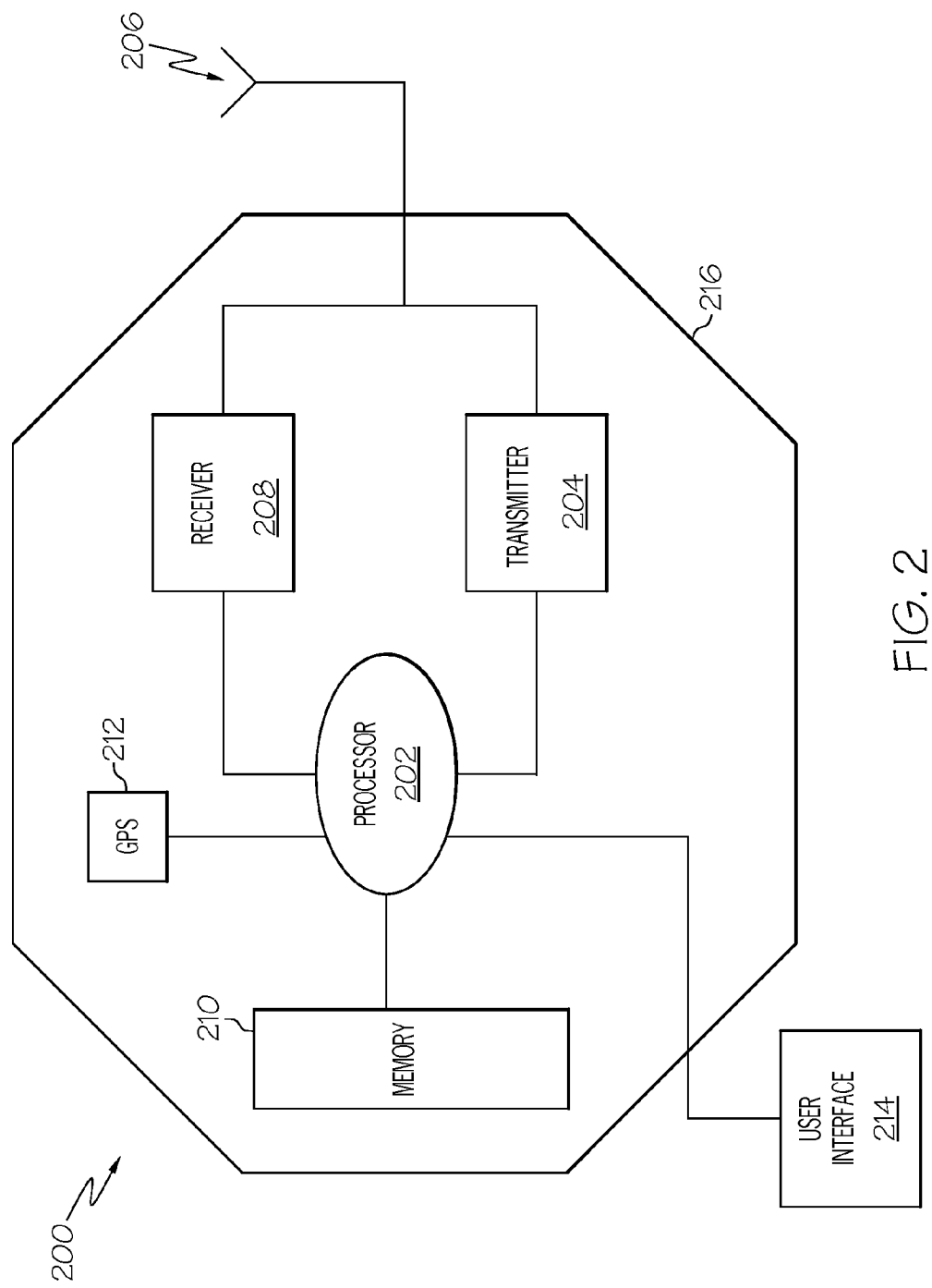
FIG. 2 is a schematic view of one embodiment of a node.

A node according to one embodiment is shown in FIG. 2. Node 200 has a general processor 202 for performing numerous computer functions. Processor 202 communicates to other nodes by sending digital data to transmitter 204. Transmitter 204 modulates the digital data and sends the modulated signal over antenna 206 to other nodes. In addition to sending signals, antenna 206 also receives signals from other nodes. In one embodiment, antenna 206 is an omni-directional antenna designed for a signal to be sent or received from any direction. The signals received from antenna 206 are demodulated by receiver 208. Receiver 208 then sends the data received to processor 202. In one embodiment, node 200 also contains a non-volatile memory 210 to store data, including configuration information. Non-volatile memory 210 can also be used to store recordings of voice communications for later analysis. Node 200 also optionally contains a GPS receiver 212 to identify the location of the node 200.

In one embodiment, node 200 is installed in a vehicle and has a user interface 214 to input communications into node 200. User interface 214 enables the user to address another vehicle by entering the number of that vehicle into user interface 214. The computer converts the vehicles number into the vehicle's IP address and sends the communication on a route to the IP address, similar to regular network traffic. In one embodiment, user interface 214 has a number pad. Alternatively, user interface 214 could employ voice-commands, a touch screen, or use any other method of entering data. User interface 214 also has a voice input mechanism. The voice input mechanism allows the computer to receive a voice signal from a user. In one embodiment, the voice input mechanism is a hands-free boom-microphone.

Prior to sending the voice signal over the network, the voice signal is converted into digital packets of data. Once formed, the packets of data are sent from one node to another by using the IEEE 802.11 standard. In one embodiment, the IEEE 802.11b standard is used. Eventually, the packets arrive at the destination node. The destination node, then converts the packets back into a voice signal and audibly provides it to the user of the destination vehicle. In one embodiment, node 200 is permanently installed in the vehicle. In another embodiment, node 200 has a carrying case 216 and is portable in that node 200 can be easily taken off of a shelf installed in a vehicle. In this embodiment, antenna 206 has a magnetic base which enables antenna 206 to be quickly attached to the roof of a vehicle.

Referring back to FIG. 1, nodes 102, 104, 106, 108, 110 communicate on the same frequency and each node has the capability of communicating with all other nodes. Wireless nodes 102, 104, 106, 108, 110 are constrained in their communication abilities, however, by the physical limitations of their radio transmitters and receivers. Any node beyond the transmission range of the radio transmitter of another node is out of direct communication with that node. For example, node 102 has a transmission range 112 which is shorter than the distance to node 108. As a result, node 102 cannot directly send a packet to node 110. When node 102 has a packet to send to node 110, node 102 relays the packet through intermediate nodes making multiple shorter distance transmissions.

Before node 102 can relay the packet through intermediate nodes, node 102 initiates route discovery to find out which nodes will connect node 102 with node 110. From the route discovery node 102 knows which node to send packets to in order to get the packets to node 110. In one embodiment, the route discovery is performed using the OLSR routing protocol. In this embodiment, there are only a few source nodes and a few destination nodes. Thus, there are a limited number of paths from any one source node to a destination node. In another embodiment, OLSR is configured to minimize the number of hops while finding a route. In FIG. 1, the route discovered using OLSR follows from node 102 over link 116 to node 108 and then over link 118 to node 110. Alternatively, any routing protocol could be used to choose a route based on the factors of a particular scenario.

In the embodiment shown in FIG. 1, nodes 102, 104, 106, 108, 110 are located in vehicles traveling in the same general direction 114 down road 120. For example, the vehicles could be a military convoy, police squadron, or even civilian commuters. Vehicles such as these often travel by a similar path and at a similar rate of speed. Thus, nodes 102, 104, 106, 108, 110 form a semi-static, substantially linear configuration where the relative relationship among nodes 102, 104, 106, 108, 110 does not change instantaneously or drastically. Additionally, the configuration of mission performing vehicles is often known prior to establishing the network.

Figure 3:
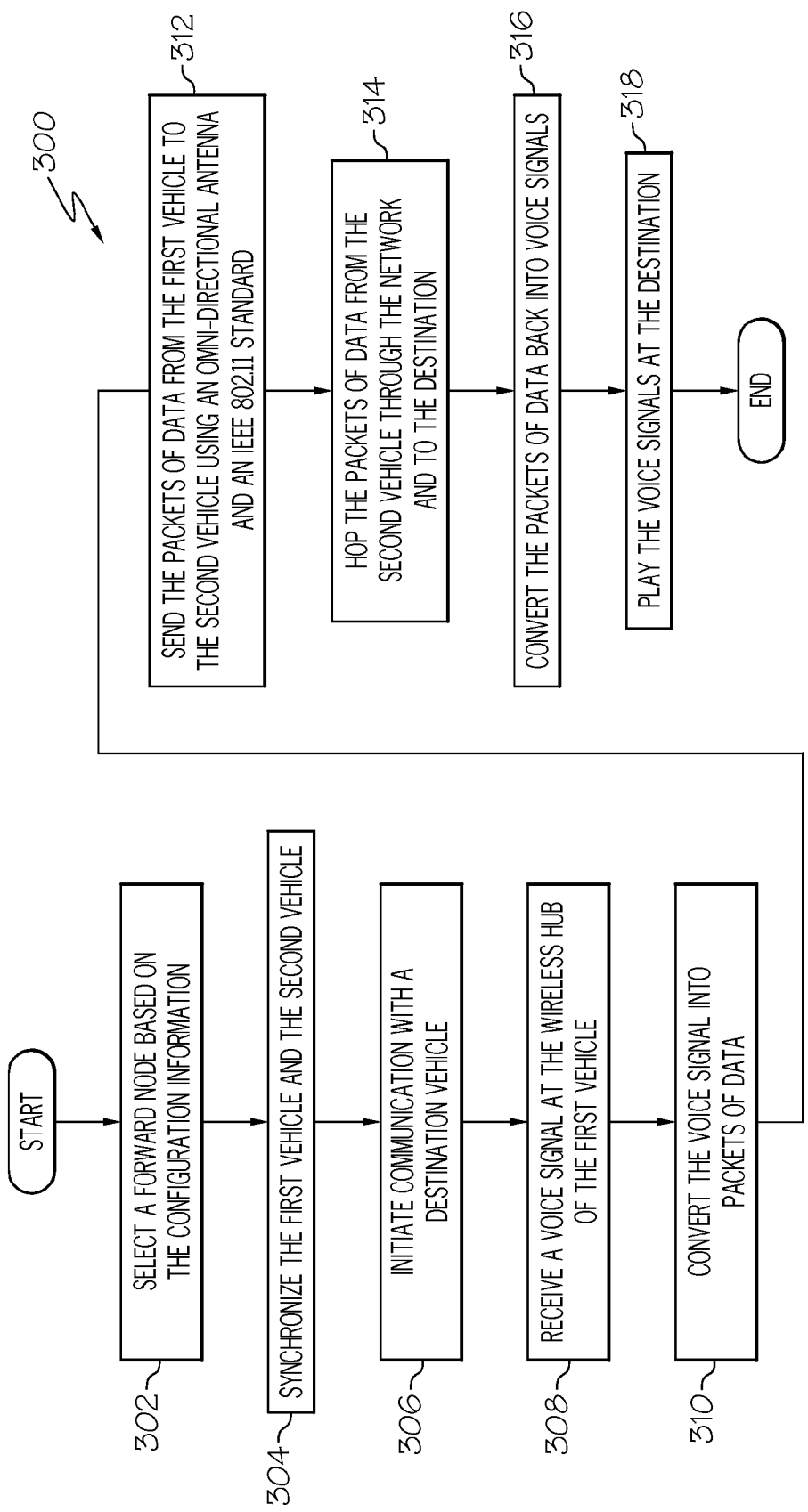
FIG. 3 is a flow diagram illustrating one embodiment of Wi-Fi voice communication between vehicles.

FIG. 3 illustrates one embodiment, of a method 300 of communicating between vehicles by using Wi-Fi. For a first vehicle to communicate with an existing network of vehicles, the first vehicle initiates an IP layer on its wireless hub (302). When the first vehicle comes into transmission range of a second vehicle which is in the network, the first and second vehicles automatically synchronize their hubs, to ensure, inter alia, that they are on the same frequency (304). The two vehicles are now ready to communicate. An operator of the first vehicle can now initiate communication with a destination vehicle to send a voice communication to the destination vehicle (306). In one embodiment, communication is initiated by dialing the address of the destination vehicle on a keypad. When a connection is made with the destination vehicle, the first vehicle receives a voice signal from a user (308). The voice signal is converted into packets so that it can be sent over the network (310). The packets are then sent from the first vehicle to the second vehicle using an IEEE 802.11 standard (312). As the packets have been received at the second vehicle, the second vehicle sends them on along the route through the network until the packets reach the destination (314). At the destination, the packets are converted back into voice signals (316). The voice signals are then played out to the users at the destination vehicle (318).

Since the configuration of nodes 102, 104, 106, 108, 110 is semi-static and known, the configuration can be exploited to enable quicker routing of packets in situations where a current route is unknown. In one embodiment, this information is captured as configuration information, recorded, and provided to each node. In one embodiment, the configuration information is provided to each node prior to set up of the network. Alternatively, the configuration information could be provided to each node at any time prior to use of the information by the node.

In one embodiment, the configuration information discloses the relative locations of each node. In this way each node knows its location relative to the other nodes of the network. For example, the configuration information will state that node 104 is ahead of node 102 and node 108 is ahead of node 104 and node 110 is ahead of node 108. Node 104 can then tell that node 110 is in one direction and node 102 is in the opposite direction. Alternatively, the configuration information could contain GPS coordinates for each node, or be in any form sufficient to communicate the relationship among the nodes 102, 104, 106, 108, 110. In one embodiment, the configuration information at each node contains information on every node within the network. Alternatively, the configuration information at each node could only contain information for nodes that are possible forwarding nodes of that node.

In one embodiment, the configuration information is updated to reflect changes in the configuration of nodes 102, 104, 106, 108, 110. Updating the configuration information can be done by a node broadcasting information to the network when the node has changed positions. For example, if node 1 will be shut down, it could broadcast "Node 1 leaving". After receiving the message, the other nodes can update their configuration information to eliminate Node 1 from the configuration. The configuration information could also update the current location of each node by utilizing GPS receivers at each node. In this embodiment, each node periodically broadcasts its GPS coordinates to the other nodes, and the other nodes can then update their configuration information. In another embodiment, the configuration information is stored in a central location and each node accesses the configuration information when needed. In this embodiment, ad-hoc network 100 is modified to include a central server.

Before the configuration information is used, in one embodiment, route discovery takes place. If a route is discovered all packets at node 102 and destined for node 108 will be sent along the discovered route. When a link breakage occurs along the route, however, the configuration information is used to temporarily route packets while a routing protocol finds a new route. Links may break due to changes in surrounding topology or an increase in the distance between two vehicles. Even in a semi-static configuration of nodes communication links between nodes may be frequently created and broken as the network topology dynamically changes. During the time period that the routing protocol is recovering the route, packets are still being generated to send along the route to the destination node. Instead of discarding the unused packets because there is no route to send the packets on, a node using configuration aware routing forwards the packets to a forward node in the direction of the destination node.

For example, in FIG. 1 node 102 is a source node sending information to node 110, a destination node, via a route that follows link 116 and link 118. In contrast to FIG. 1, in FIG. 4 the vehicle containing node 108 has increased its speed and the distance between node 102 and node 108 is now farther than the transmission range 112 of node 102. Link 116 between node 102 and node 108, therefore, has broken and packets can no longer be sent along the route from node 102 to node 108. In another embodiment, the destination is a server which communicates with other nodes that are not in the ad-hoc network.

In one embodiment, when node 102 receives or generates a new packet for node 110, node 102 detects that the active route for the packet is invalid. In one embodiment, node 102 detects that the route is invalid by receiving a signal from a node on the route that the link to the next node in the route is broken. Since node 102 cannot send the packet along the route, node 102 initiates route recovery. While the route recovery is taking place, node 102 uses the configuration data to forward the packet. To forward the packet, node 102 determines the destination node for the packet. In this example, the packet has a destination node of node 110; therefore, node 102 will try to send the packet in the direction of node 110. In one embodiment, node 102 looks at the configuration information and determines that node 110 is ahead of node 102 in the convoy. Node 102 then looks to the configuration information and determines that the node immediately in front of node 102 in the direction of node 110 is node 104. Node 102 then forwards the packet to node 104.

Alternatively, node 102 can identify a subgroup of the nodes as possible forwarding nodes. In one embodiment, the nodes identified in the subgroup are those nodes that are in direct communication with node 102. In FIG. 2, node 104, and node 106 are in direct communication with node 102. The subgroup identified by node 102, therefore, consists of node 104 and node 106. From the subgroup, node 102 selects a forward node to send the packet to. In one embodiment, node 102 refers to the configuration information to select which nodes are in a direction towards node 108. In one embodiment, node 102 compares the list of possible forwarding nodes with the list of nodes in the direction of node 108. Since node 104 is on both lists, the comparison returns node 104 as a forwarding node. Node 102 will then send packets through link 120 to node 104. Alternatively, selection of the forwarding node could use any method sufficient to identify a node in the direction of the destination node.

In one embodiment, the forward node is selected prior to the routing protocol fully discovering a new route. Thus, node 102 cannot be sure whether there is a path from node 104 to node 110. Node 102 only knows that node 104 is in the direction of node 110. Node 102 forwards the packet to node 104 on the assumption that node 104 and the nodes farther down stream will continue forwarding the packet toward node 110 until the packet eventually reaches node 110.

In one embodiment, once the packet gets to node 104, if no route has been created at node 104 to node 110, node 104 goes through the same process of configuration aware routing of the packet. Here, the selection process chooses to send the packet to node 106. The selection process at node 104 performs similarly to that at node 102. In one embodiment, node 104 refers to the configuration data, and realizes that node 102 is in a direction opposite of node 110 and that node 108 is in a direction toward 110. Node 104 then selects node 108, because node 108 is in the proper direction.

In one embodiment, once the packet is received by node 108, node 108 quickly ascertains that node 108 has a direct connection to node 110. Node 108 then sends the packet directly to node 110. The process of forwarding packets from node 102 is repeated for all the packets at node 102 and destined for node 110, until the routing protocol recovers a route to node 110. Thus, the packets from node 102 get to node 110 without having to wait for a new route to be discovered. In one embodiment, once a route is recovered by the routing protocol, node 102 stops forwarding packets by configuration aware routing and sends the packets on the newly discovered route.

Figure 4:
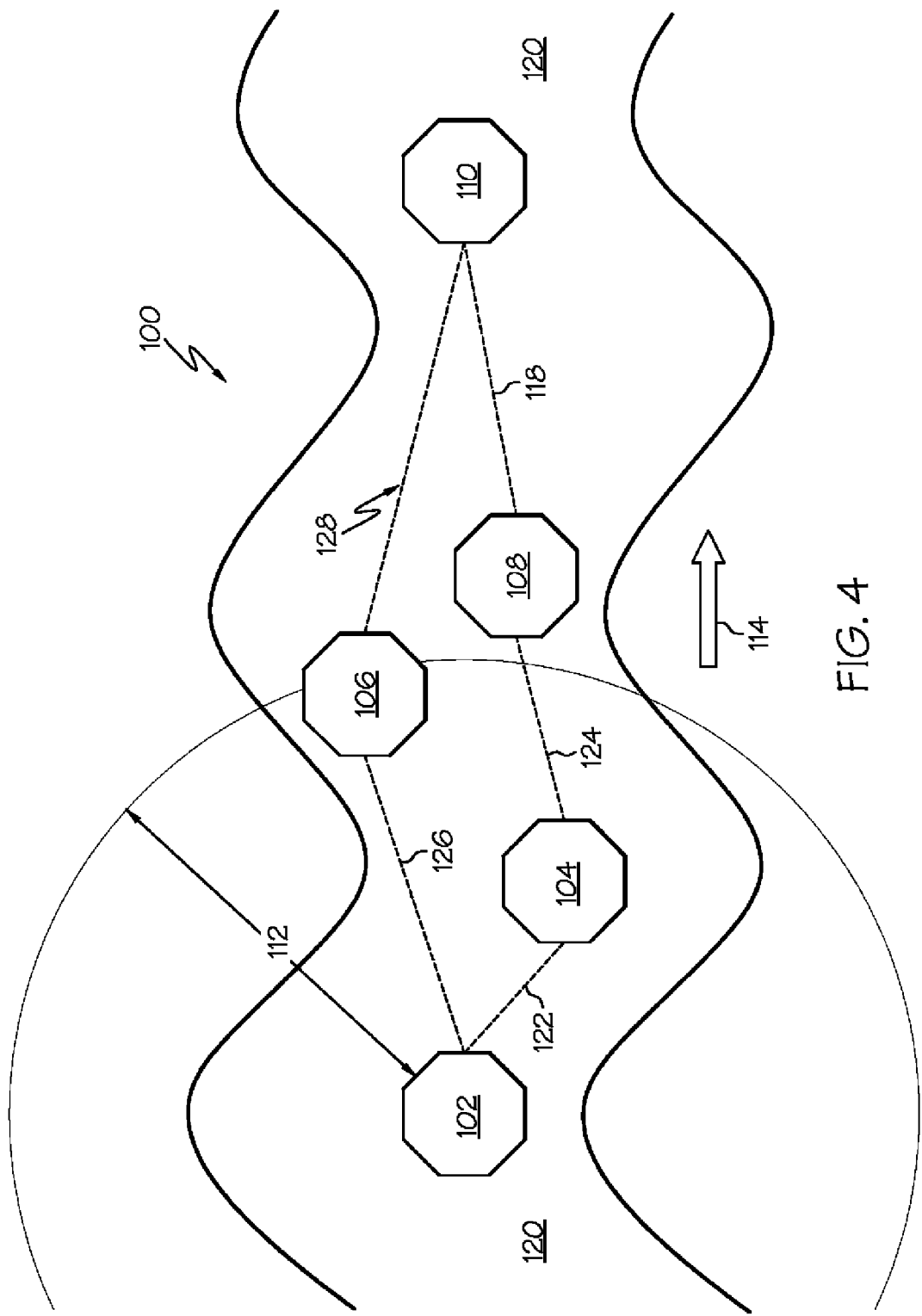
FIG. 4 is a schematic view of another embodiment of nodes in a mobile ad-hoc network.
Figure 5:
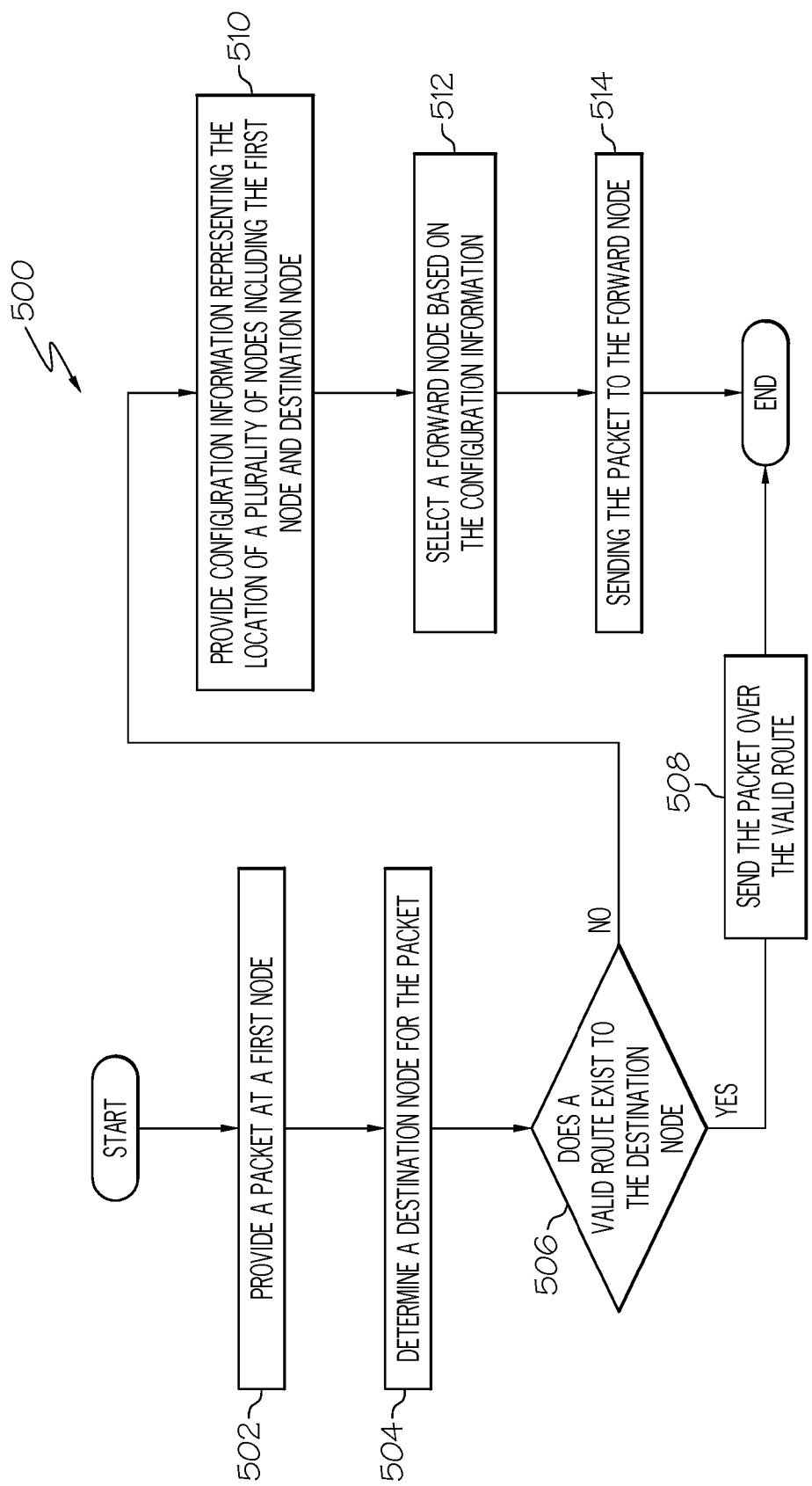
FIG. 5 is flow diagram illustrating one embodiment of a method of routing packets in an ad-hoc network.

One embodiment of a method 500 of routing nodes in a MANET is shown in FIG. 4. A packet is provided at a first node (502). Once the packet is provided, the first node determines a destination node for the packet (504). If a valid route, i.e. a route with no breakages, to the destination node exists (506), the packet is sent down the valid route and to the destination (508). If no valid route exists, configuration information is provided to the node (510). The configuration information details the location of all the nodes within the network. Once, the first node knows the destination node, the first node can look at the configuration information to determine which node starts a path to the destination node (512). Once the forward node is determined, the packet is send to the forward node (514).

FIG. 6 illustrates one embodiment of a configuration 600 used for a simulation. The simulation uses configuration aware routing in an ac-hoc network. Configuration 600 has five nodes 602, 604, 606, 608, 610 substantially forming a line with a 470 meter distance (612) between adjacent nodes. Each node 602, 604, 606, 608, 610 has a transmission range of 1 kilometer. In configuration 600, nodes 602, 604, 606, 608, 610 are moving in the same direction 614 with randomly varying speeds averaging 10 m/s. Configuration 600 has one source node 602 and one destination node 610.

Figure 7A:
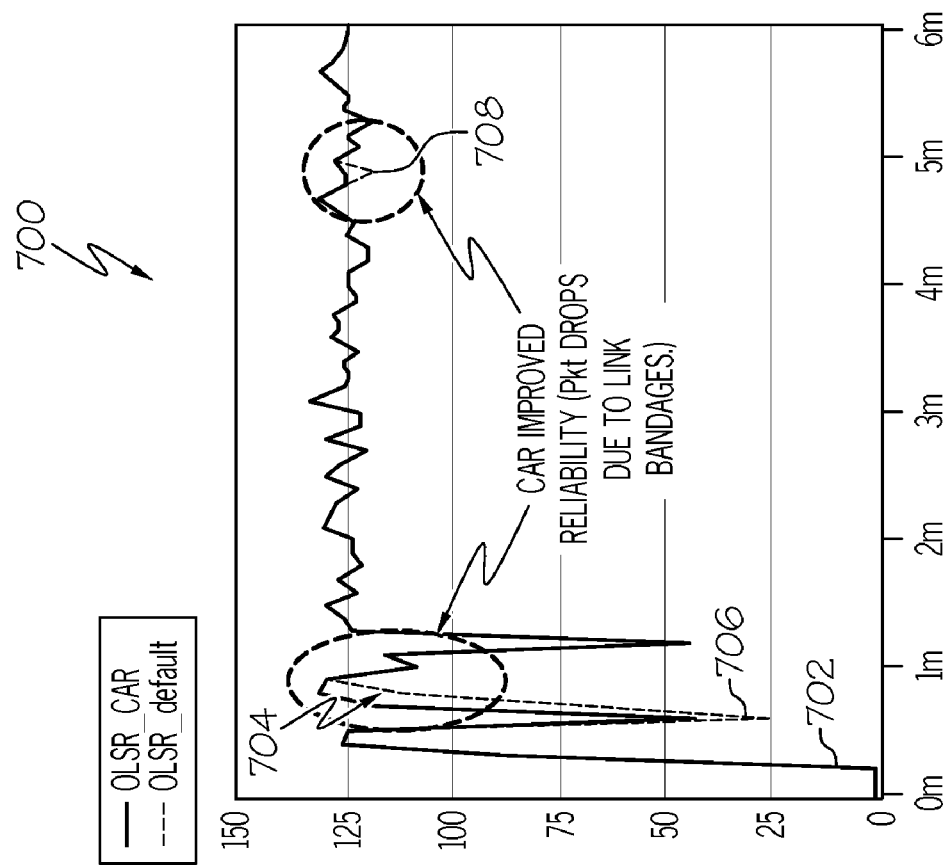
FIG. 7A is a graph illustrating results of a simulation on the embodiment of nodes shown in FIG. 6.
Figure 7B:
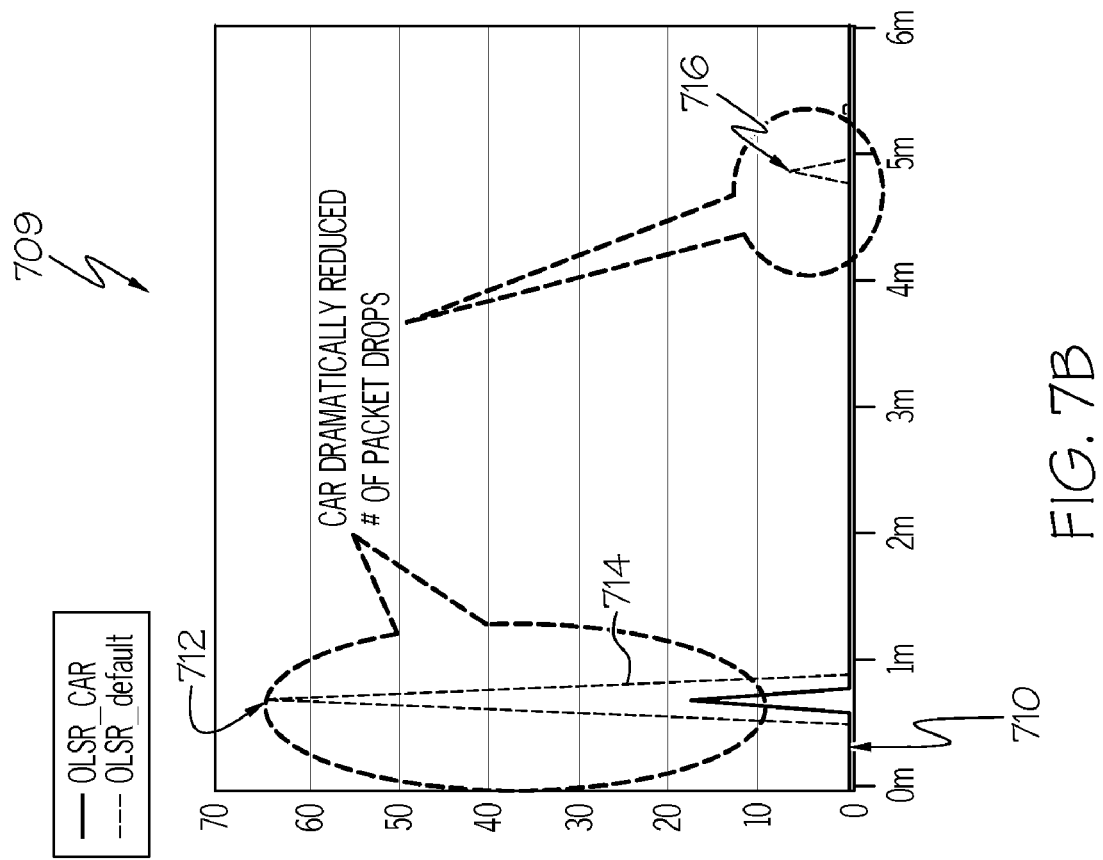
FIG. 7B is another graph illustrating results of a simulation on the embodiment of nodes shown in FIG. 6.

The simulation compares the reliability and the number of packets dropped after a route failure occurs, between a standard OLSR routing protocol and an OLSR routing protocol that used configuration aware routing (CAR). The results of the simulation are shown in FIGS. 7A and 7B. FIG. 7A contains graph 700 which shows the number of packets received by destination node 710 per second. In the simulation, node 702 attempts to send packets at a constant rate to node 710. Line 702 represents packets received using CAR and line 704 represents the packets received using the standard OLSR. CAR noticeably increased the number of packets delivered just before the 1 minute mark 706 and just before the 5 minute mark 708.

Graph 709 of FIG. 7B shows the number of packets dropped by the network due to a route failure. Line 710 represents the packets dropped using CAR and line 712 represents the packets dropped using standard OLSR. Again noticeable improvement was made around the 1 minute mark (714) and 5 minute mark (716). Data was also computed that compared the minimum latency, maximum latency, maximum inter-arrival time and mean inter-arrival time. The minimum latencies for standard OLSR and OLSR with CAR were the same, being 0.001517 sec. This could be expected as CAR is less likely to have an effect when the routing protocol is working properly. The maximum latency for standard OLSR was 0.37 sec. compared to 0.47 sec. for OLSR with CAR. A big improvement was revealed in the maximum inter-arrival time which came out to 7.18 sec. for standard OLSR and 4.21 for OLSR with CAR. Here CAR made a noticeable difference dropping the maximum inter-arrival time by almost 3 seconds. Finally, the mean inter-arrival time was 0.008174 sec. for standard OLSR and 0.008115 sec. for OLSR with CAR.

In the third aspect of the present methods and apparatuses the increasing error rate of a route is countered by sending redundant packets towards the destination node. In one embodiment, each redundant packet contains the same payload information. Thus, if the original packet does not reach the destination node because of a link error or a link breakage, the information being sent to the destination node can still arrive on time via one of the redundant packets. In one embodiment, the redundant packets are exact copies of the original packet. In another embodiment, the redundant packets contain only the same payload information, but contain different routing data because, for example, the packets are sent along different routes.

The longer the route that a packet must travel along, the higher the probability that the packet will not reach the destination. Each time a packet is sent from one node over the air to another node, there is a chance that the packet will not reach the second node. For example, the link between the two nodes could break, because the first node is out of range to send the packet to the second node. Alternatively, there could be an error during transmission that causes the second node to improperly receive the packet. The more hops a packet must travel over, the more links the packet must travel along. The more times a packet travels over a link, the more likely it is that one of the times the packet is traveling over the link, the packet will run into problems. Thus, the longer the route, the higher the error rate for the route.

In one embodiment, to account for the increase in the error rate as the length of the route increases, the number of redundant packets sent is adjusted based upon the distance to the destination node. One way of determining the distance to the destination node is to find the length of the primary route to the destination node. The length of a route can be determined by the number of hops that a packet must take along the route. In another embodiment, the distance to the destination node is the physical line of sight distance between the nodes. Alternatively, the distance could be the cumulative distance between all the nodes of a route, or any other measure sufficient to provide a relative indication of the distance.

Referring back to FIG. 1, in one embodiment, the redundant packets are each sent along a different route. In this embodiment, prior to sending the packets, a multi-path routing protocol has discovered three routes from node 102 to node 110. One of the routes is selected as a primary route by the routing protocol, leaving the other routes as backup routes. In this embodiment, the primary route is selected as node 102 along link 116 to node 108 and then along link 118 to node 110. A first backup route travels from node 102 along link 122 to node 104, then along link 124 to node 108, and then along link 118 to node 110. A second backup route travels from node 102 along link 126 to node 106 and then along link 128 to node 110. In one embodiment, the distance from node 102 to node 110 is determined along the primary route and is determined to be two hops.

Once the distance is determined, a redundancy factor can be calculated. In one embodiment, the redundancy value is calculated by referring to prior analysis of similar network routing conditions. In this embodiment, a redundancy value of two is calculated for a route with a distance of two hops. In one embodiment, the origination node creates a number of redundant packets equal to the redundancy value and sends the packets towards the destination. Since there is a redundancy value of two, two packets will be sent from node 102 to node 110. One of the packets is sent along the primary route. The other packet, in one embodiment, is sent along a redundant route. The redundant route is chosen from the backup routes. In this example, there are two backup routes, but only one will be chosen as a redundant route.

In one embodiment, the redundant route is chosen by looking for the maximum disjointed path. The maximum disjointed path is the route with the least nodes in common with the primary route. Thus, in FIG. 1, the primary route uses node 102, node 108, and node 110. The first backup route uses node 102, node 104, node 108, and node 110. The first backup route, therefore, has three nodes in common with the primary route, node 102, node 108, and node 110. The second backup route uses node 102, node 106, and node 110. The second backup route has only two nodes in common with the primary route. Thus, the maximum disjointed is the second backup route traveling through link 126 and link 128, and this route is chosen as the redundant route. In another embodiment, the redundant route is chosen based on the shortest route to the destination. In FIG. 1, the route using link 126 and link 128 is again chosen as the redundant link, because it has only two hops, while the other backup route has three hops. In yet another embodiment, configuration aware routing is used as a redundant route. Configuration aware routing can be used if, for example a single path routing protocol is used, or a multi-path routing protocol does not discover enough backup routes to meet the redundancy need. Alternatively, configuration aware routing can be used instead of backup routes, even if enough backup routes are discovered.

In FIG. 1, assuming a redundancy value of 2 and using the maximum disjointed path as the redundant path, node 102 first generates two identical packets. Node 102 sends the primary packet over link 116 to node 108 and the redundant packet over link 126 to node 106. Here, the primary route is intact, so the primary packet reaches destination node 110 and is processed. The redundant route is also intact, so the redundant packet will also arrive at destination node 110. Since destination node 110 has already received the primary packet, the redundant packet is not needed and is discarded. Referring now to FIG. 4, node 108 has increased its speed and is no longer in direct communication with node 102. Node 102 will again attempt to send the primary packet over link 116 and the redundant packet over link 126. This time since link 116 has been broken, the primary packet is dropped and does not reach node 110. The redundant route, however, is still intact, so the information reaches node 110 in the redundant packet.

In another embodiment, the redundant packets are sent down the same route as the primary packet. Thus, if the primary packet is dropped because of an error along the primary route, the information can still reach the destination node via one of the redundant packets. Alternatively, multiple redundant packets could be sent down a single redundant route, or any other combination of spreading redundant packets across routes and sending redundant packets down the same route could be utilized.

Figure 8:
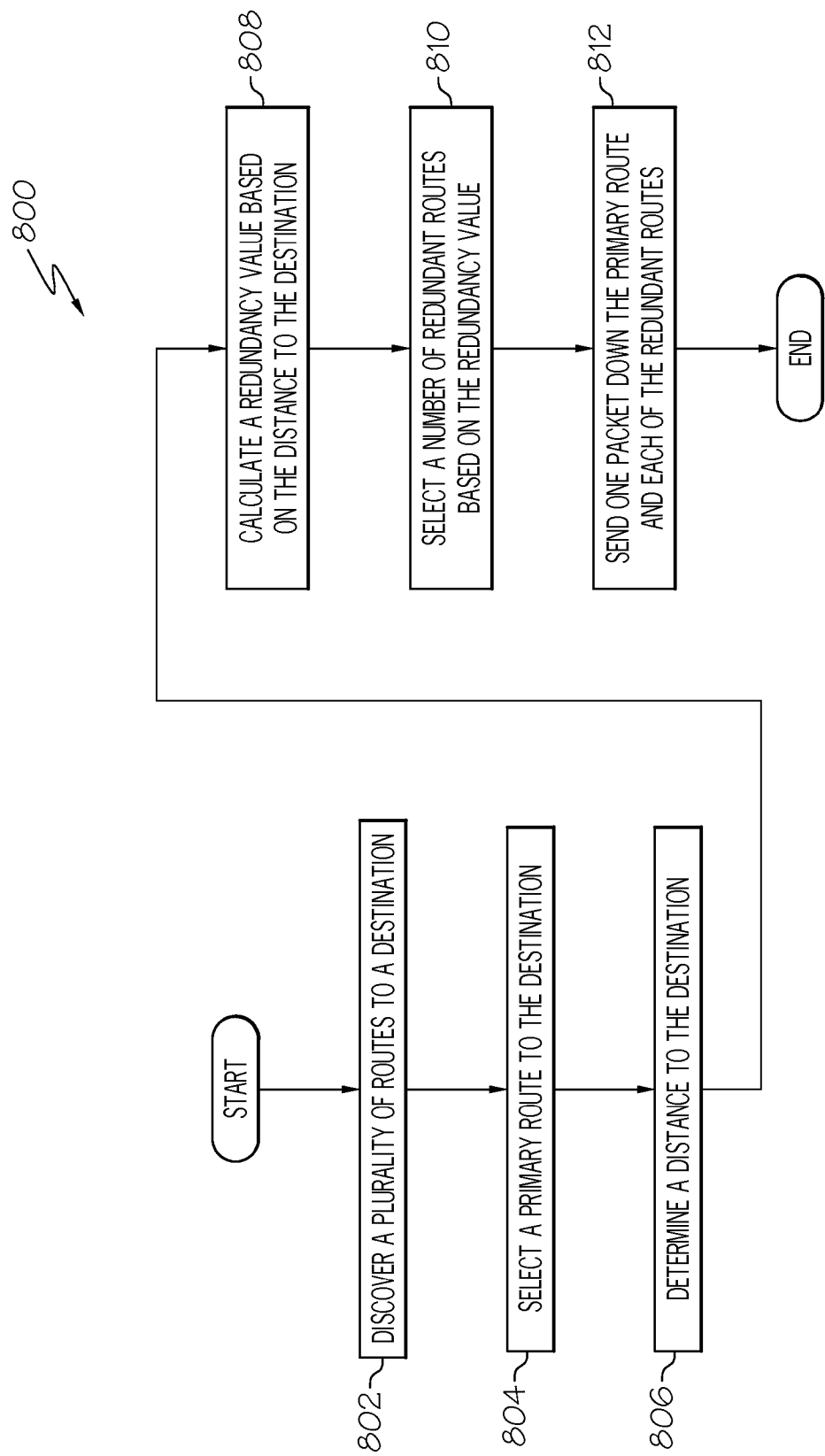
FIG. 8 is a flow diagram illustrating one embodiment of another method of routing packets in an ad-hoc network.

Referring now to FIG. 8, one embodiment of a method 800 of routing packets is illustrated. First a plurality of routes is discovered by the routing protocol (802). The routing protocol then selects a primary route from the plurality of routes (804). Before sending the packets a distance to the destination is determined (806). A redundancy value can then be calculated based on the distance to the destination (808). Using the redundancy value, a number of redundant routes are picked so that the correct number of routes exists including the primary route (810). Finally, one of the group of identical packets is sent down each route (812).

Sending redundant packets may result in packets from the same message arriving at the destination out of order. For example, if link 116 is later re-established and packets are once again sent along the route, the first packets re-sent along the route may arrive before the last packets sent along the redundant route. This variation in order results from packets on one route taking more travel time than packets on another route. Differential in time between two routes can occur because the packets on one route must travel farther or must take more hops, thus lengthening the time to reach the destination.

Before the packets can be processed by destination node 110, therefore, the packets may need to be re-ordered into their proper sequence. In one embodiment, each route has a small buffer that holds the packets received from that route at the destination node. The destination node 110 requests from each buffer the packet next in sequence from the last packet processed. Any buffer having the requested packet releases the requested packet to destination node 110. Therefore, even if packets arrive out of order, the packets will be sent to the processor of destination node 110 in the proper sequence. Destination node 110 discards any duplicate packets received.

In one embodiment, to counter the increased time taken by packets on longer routes, packets that travel farther are forwarded quicker than packets that travel on shorter routes. Every packet that arrives at a node is placed in a queue where it awaits processing. In its most basic form, the node places each packet into a queue and processes each packet in the order received. Thus, if a node currently has a lot of packets traveling through it, a packet reaching that node can have a long wait in the queue before being forwarded by the node. Often queue delays are the most significant factor in the latency of a route. When packets are sent along multiple routes, long queue waits on one route can cause the packets from other routes to arrive significantly out of order. Further, route latency becomes progressively worse as a route becomes longer. The longer the route, the more nodes a packet must travel through, and the more likely that one or more of those nodes will have a long wait time. Since some packets, like VoIP packets, are more time sensitive than other packets, packets are given a priority value. Packets with a higher priority value are moved ahead in the queue, and are therefore forwarded quicker.

In one embodiment, to counteract queue waits on longer routes, packets traveling on longer routes are forwarded quicker. One way to accomplish this is to set the priority value of packets traveling along long routes to a higher value. This, however, requires knowledge in advance of which routes are longer. Routes with unknown lengths, e.g. when configuration aware routing is used, must use some other method of reducing the forwarding time. In one embodiment, each packet adds an aging value to the priority value of the packet.

The aging value is increased each time a packet is forwarded to another node. Thus, in FIG. 1, the aging value for a packet traveling along a route through link 122, link 124, and link 118 is initially set to zero at origination node 102. When the packet reaches node 104, the aging value is increased to 1. Likewise, at node 108 the aging value is increased to 2. As the packet travels farther along the route, it gets an increasingly higher priority. Packets that have traveled a long distance, therefore, are forwarded quicker and arrive closer to the time of packets on shorter routes.

As an example, two packets are sent by node 102 without an aging value down the primary route and the redundant route described above. The packet sent down the primary route likely to reach node 110 one full queue wait time before the redundant route packet, because the primary route has one less hop. Using the aging value, however, when the redundant packet arrives at node 108, the redundant packet will be placed farther ahead in the queue and will not have to wait a full queue wait time. Alternatively, the aging value could be based on the time elapsed since the packet was forwarded from the source node, or any other measure sufficient to allow a packet with a potential longer delay to achieve a higher priority.

In one embodiment, the redundancy value for a route is calculated based on the link error probability of the route and the desired reliability requirement. Since longer routes have higher link error probabilities, a longer route receives a higher redundancy value than a shorter route. Link error probability refers to the number of packets dropped out of every 100 packets sent across a link. For example, if the link error probability for a link is 0.05, then on average 5 out of every 100 packets will be dropped across that link.

Figure 9:
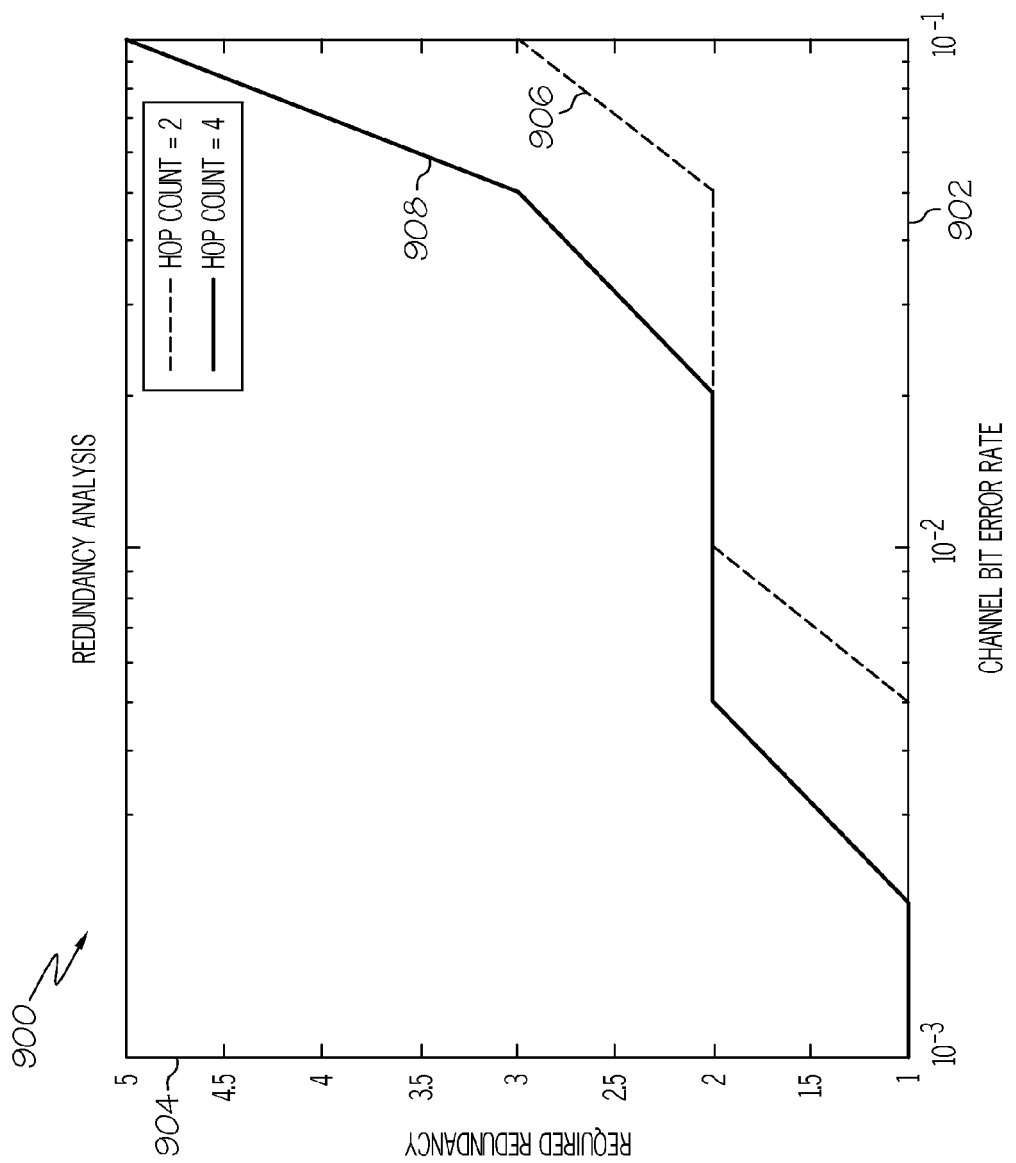
FIG. 9 is a graph illustrating results of a simulation on another embodiment of nodes similar to FIG. 6.

Graph 900 in FIG. 9 illustrates the results of a simulation designed to show the redundancy value required to achieve a 99% packet delivery ratio. Axis 902 shows the link error probability and axis 904 shows the redundancy value. In the simulation two routes were analyzed, the first route, line 906, having a hop count of 2 and the second route, line 908, having a hop count of 4. On each of the routes, the link error probability was increased from 0.001 to 0.1 packets per hundred. The simulation assumed the same link error rate at each link. Additionally, the simulation assumed that there were infinite independent multi-paths to choose as routes.

On graph 900 following line 906 from left to right, a route with two hops needs to send only one packet (i.e. no redundancy) to meet the 99% delivery ratio. This is true until the link error rate reaches 0.05. If a route has a link error rate of 0.01 a redundancy value of two is needed to achieve a 99% delivery ratio. Once the link error rate reaches 0.1 a redundancy value of 3 is necessary. Now referring to line 908, the route with four hops also needs no redundant packets for a route with a link error rate of 0.001. Line 908 quickly jumps, however, to a redundancy value of 2 if a route has a link error rate of 0.05. A route with a link error rate of 0.1 needs a redundancy value of 5. Dotted line 910 emphasizes at what link error rates a redundancy value of 2 is adequate.

Figure 10:
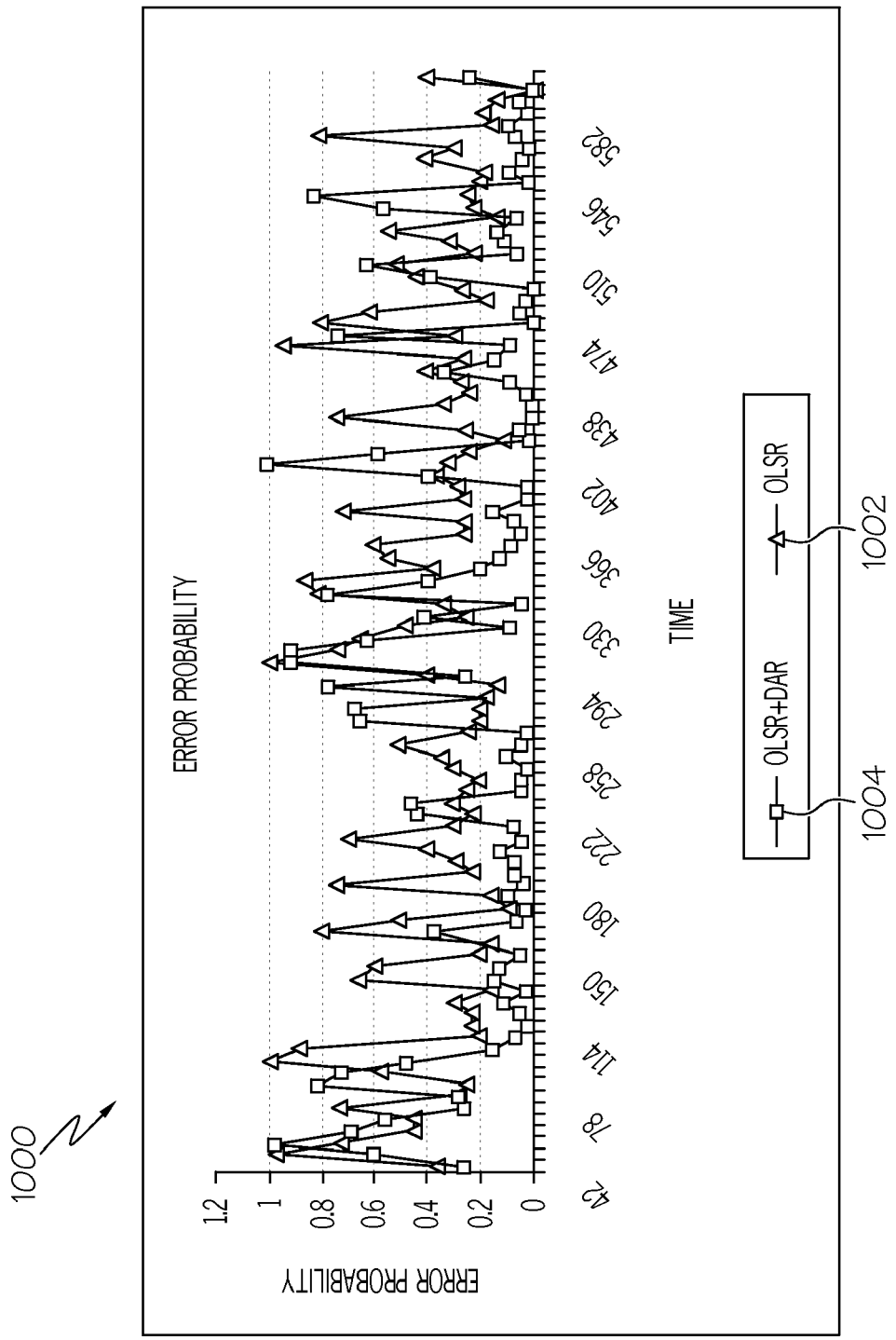
FIG. 10 is a graph illustrating results of another simulation on an embodiment of nodes similar to FIG. 6.
Figure 11:
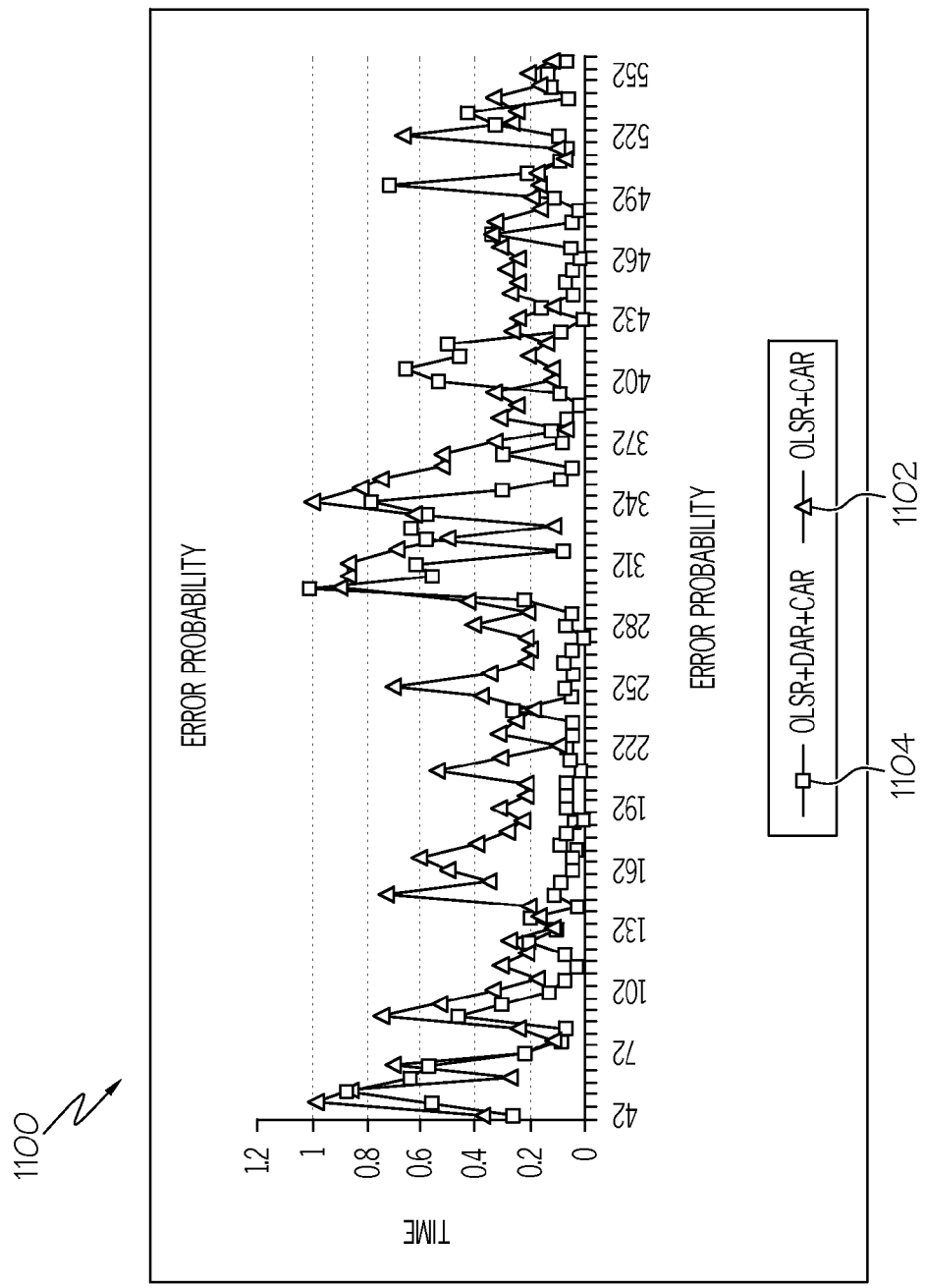
FIG. 11 is a graph illustrating results of yet another simulation on an embodiment of nodes similar to FIG. 6.

Graphs 1000 and 1100 in FIGS. 10 and 11 respectively illustrate the results of a simulation similar to that shown in FIG. 6. The configuration for these simulations, however, was increased to 50 vehicles, with the 50 vehicles traveling in a linear configuration. Graph 1000 shows time in seconds on the horizontal axis and the instantaneous packet error probability on the vertical axis. Graph 1000 contains line 1002 and line 1004. In both line 1002 and line 1004 packets were sent at a constant rate from the last vehicle in the convoy to the first vehicle. Different routing protocols were used. Line 1002 illustrates a simulation using OLSR alone and line 1004 illustrates a similar simulation using OLSR with distance adaptive routing (DAR). Both simulations assumed the same link error probability. As shown, OLSR with DAR considerably reduces end-to-end packet error. The average packet error of OLSR, line 1004 is 0.4, whereas the average packet error of OLSR with DAR, line 1006 is 0.24.

Graph 1100 shows the results of a similar simulation as shown in graph 1000. In this simulation, however, OLSR with DAR, line 1102 was compared to OLSR with DAR and CAR, line 1104. OLSR with DAR and CAR shows another improvement over OLSR with only DAR. The average packet error rate for OLSR with DAR was 0.35, whereas OLSR with DAR and CAR showed an average packet error rate of 0.24.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of routing packets in a wireless mobile ad-hoc network comprising:
    determining a hop count for a primary route from a first node of the wireless mobile ad-hoc network to a second node of the wireless mobile ad-hoc network;
    calculating a redundancy value based on the hop count for the primary route;
    sending from the first node of the wireless mobile ad-hoc network a first plurality of packets containing identical payload information down a number of routes equal to the redundancy value; and
    at the second node of the wireless mobile ad-hoc network, forwarding a first packet of the first plurality of packets before a second packet of the first plurality of packets, wherein the first packet has traveled through more nodes of the wireless mobile ad-hoc network than the second packet.

2. The method of claim 1, wherein sending the packets further comprises:
    concurrently sending all the packets.

3. The method of claim 1, further comprising:
    discovering a plurality of routes to a destination;
    selecting the primary route from the plurality of routes thereby designating all other routes of the plurality of routes as backup routes, wherein determining the hop count determines the hop count for the primary route; and
    selecting at least one redundant route from the backup routes, wherein the number of routes includes the primary route and the at least one redundant route.

4. The method of claim 3, wherein selecting the at least one redundant route further comprises:
    choosing a maximum disjointed path from the primary route.

5. The method of claim 1, further comprising:
    forwarding packets with longer routes quicker than packets with shorter routes.

6. A method of routing packets in a wireless mobile ad-hoc network comprising:
    determining a distance to a destination from a first node of the wireless mobile ad-hoc network along a primary route;
    calculating a redundancy value based on the distance to the destination along the primary route;

sending from the first node of the wireless mobile ad-hoc network a number of packets equal to the redundancy value toward the destination, wherein each packet has the same payload information; and forwarding, from the destination, a first packet of the number of packets before a second packet of the number of packets, wherein the first packet has traveled a greater distance through the mobile ad-hoc network than the second packet.

7. The method of claim 6, wherein sending the number of packets further comprises:

using configuration aware routing to send at least one of the packets.

8. The method of claim 6, wherein determining the distance further comprises:

counting a number of hops on a route to the destination.

9. The method of clam 6, wherein sending the number of packets further comprises:

sending all the packets down a single route.

10. The method of claim 6, further comprising:

discovering a plurality of routes to the destination;

selecting the primary route from the plurality of routes, thereby designating as backup routes all routes not selected as the primary route from the plurality of routes;

selecting at least one redundant route from the backup routes; and wherein sending the number of packets comprises sending at least one packet down the primary route and at least one packet down the at least one redundant route.

11. The method of claim 10, wherein selecting the at least one redundant route further comprises:

selecting a number of routes equal to the redundancy value minus one; and wherein sending the number of packets further comprises sending one packet down the primary route and one packet down each redundant route.

12. The method of claim 10, wherein selecting the at least one redundant route further comprises:

selecting a maximum disjointed path from the primary route.

13. The method of claim 6, further comprising:

receiving one of the number of packets at the destination;

incrementing an aging value for the received packet; and prioritizing a plurality of packets including the received packet, based on the aging value of each packet.

14. The method of claim 13, wherein prioritizing the plurality of packets further comprises:

providing a plurality of priority queues; and placing packets of similar priority in a same queue.

15. The method of claim 6, wherein calculating the redundancy value further comprises:

calculating an error probability based on the distance to the destination; and wherein calculating the redundancy value is further based on the error probability and a desired error rate.

16. The method of claim 6, wherein sending the number of packets is sending a first round of packets, the method further comprising:

sending at least a second round of packets;

receiving at the destination at least one of the second round of packets prior to the first round of packets; and re-ordering the received packets.

17. The method of claim 6, wherein determining the distance further comprises:

determining a physical distance to the destination.

18. A method of processing packets at a first node of a wireless mobile ad-hoc network, the method comprising:

receiving a first packet of a plurality of packets sent from a node at the first node of the wireless mobile ad-hoc network, wherein each of the plurality of packets has a corresponding aging value representing how many times each of the plurality of packets has been forwarded from any node of the wireless mobile ad-hoc network to any other node of the wireless mobile ad-hoc network;

incrementing the aging value corresponding to the first packet when the first packet is received at the first node of the wireless mobile ad-hoc network;

prioritizing the plurality of packets including the first packet and a second packet of the plurality of packets, based on the aging values associated with each of the plurality of packets; and forwarding the packets from the first node of the wireless mobile ad-hoc network to another node of the wireless mobile ad-hoc network based on the priority of the packets, wherein the first packet is forwarded before the second packet when the first packet has a higher aging value than the second packet.

19. The method of claim 18, further comprising:

providing a plurality of priority queues; and placing packets of similar priority in a same queue; and wherein forwarding the packets takes packets from the plurality of priority queues.

20. The method of claim 18, wherein the prioritizing further comprises:

adding the aging value corresponding to the first packet to an existing priority value of the first packet; and wherein prioritizing the plurality of packets prioritizes based on the priority value including the aging value.

* * * * *